US007204239B2

(12) United States Patent
Iriyama

(10) Patent No.: US 7,204,239 B2
(45) Date of Patent: Apr. 17, 2007

(54) FAILURE DIAGNOSTIC APPARATUS AND FAILURE DIAGNOSTIC METHOD FOR IN-TANK CANISTER SYSTEM

(75) Inventor: Yojiro Iriyama, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 137 days.

(21) Appl. No.: 11/176,201

(22) Filed: Jul. 8, 2005

(65) Prior Publication Data

US 2006/0016252 A1 Jan. 26, 2006

(30) Foreign Application Priority Data

Jul. 23, 2004 (JP) ............................ 2004-216245

(51) Int. Cl.
*F02M 33/02* (2006.01)
*G01M 19/00* (2006.01)

(52) U.S. Cl. .................. 123/520; 123/198 D; 73/118.1

(58) Field of Classification Search ................ 123/520, 123/519, 518, 198 D, 516; 73/118.1, 116, 73/119 A See application file for complete search history.

(56) References Cited

U.S. PATENT DOCUMENTS 5,373,823 A * 12/1994 Kuroda et al. .............. 123/520
5,443,051 A * 8/1995 Otsuka ....................... 123/520
5,542,396 A * 8/1996 Moz ........................... 123/520
5,767,395 A * 6/1998 Goto et al. ................ 73/118.1
6,279,548 B1 * 8/2001 Reddy ........................ 123/520
6,305,361 B1 * 10/2001 Takaku et al. .............. 123/520
6,330,878 B1 * 12/2001 Perry et al. ................. 123/519
6,712,049 B2 * 3/2004 Kawano ..................... 123/520
6,814,063 B2 * 11/2004 Kawano et al. ............. 123/520
6,950,742 B2 * 9/2005 Yamaguchi et al. ........ 701/114
2003/0029226 A1 * 2/2003 Kawano .................. 73/40.5 R
2004/0244781 A1 * 12/2004 Toyoda ....................... 123/520
2004/0267435 A1 * 12/2004 Fujimoto .................... 701/107

FOREIGN PATENT DOCUMENTS

JP A 9-195861 7/1997
JP A 2001-115915 4/2001
JP A 2001-317417 11/2001
JP A 2003-28009 1/2003

* cited by examiner

*Primary Examiner*—Carl S. Miller
(74) *Attorney, Agent, or Firm*—Kenyon & Kenyon LLP

(57) ABSTRACT

A blocking device provided in an evaporation passage is placed in an open state such that communication between an inside of a canister and an inside of a fuel tank is permitted, a negative pressure generating device provided in an atmospheric passage is operated, and a pressure in the fuel tank is detected, whereby whether a failure has occurred in the fuel tank is determined. Then, the blocking device is placed in a blocking state, the negative pressure generating device operated, and a pressure in the canister is detected, whereby whether a failure has occurred in the canister is determined.

9 Claims, 5 Drawing Sheets

FIG. 4A

| CANISTER | FUEL TANK | BEHAVIOR OF PRESSURE |
|---|---|---|
| OK | OK | (b) |
| NG | OK | (b) |
| OK | NG | (c) |
| NG | NG | (c) |

FIG. 4B

| CANISTER | FUEL TANK | BEHAVIOR OF PRESSURE |
|---|---|---|
| OK | OK | (a) |
| NG | OK | (b) |
| OK | NG | (a) |
| NG | NG | (c) |

FAILURE DIAGNOSTIC APPARATUS AND FAILURE DIAGNOSTIC METHOD FOR IN-TANK CANISTER SYSTEM

INCORPORATION BY REFERENCE

The disclosure of Japanese Patent Application No. 2004-216245 filed on Jul. 23, 2004 including the specification, drawings and abstract is incorporated herein by reference in its entirety.

BACKGROUND OF THE INVENTION

1. Field of the Invention

The invention relates to a failure diagnostic apparatus that is provided for a canister system for processing evaporated fuel generated in a fuel tank (e.g. a fuel tank for an automobile), and a failure diagnostic method that is performed by the failure diagnostic apparatus.

2. Description of the Related Art

As disclosed in Japanese Patent Application Publication No. JP(A) 2003-28009, a canister system for preventing evaporated fuel generated in a fuel tank from being released in the atmosphere is provided in a fuel supply system of an engine for an automobile. In such a system, the evaporated fuel generated in the fuel tank is temporarily stored in a canister, and the evaporated fuel is introduced (purged) to an intake passage by an intake negative pressure of an intake system of the engine.

In this type of system, if a failure, for example, formation of a hole, a crack, and inappropriate sealing, occurs in the fuel tank or the canister, the evaporated fuel leaks from a portion where the failure occurs. It is, therefore, important to detect such a failure promptly in this type of system.

Generally, a following failure diagnostic operation is performed in order to detect such a failure. In this operation, first, a negative pressure (an intake negative pressure of an engine intake system) is introduced to a system including the fuel tank and the canister, while the system is shut off from the outside air. Then, when the pressure in the system has reached a predetermined negative pressure, introduction of the negative pressure is stopped (i.e, the system is sealed). A change in the pressure in the system, which occurs after the introduction of the negative pressure is stopped, is monitored by a pressure sensor. If a failure has occurred, the pressure in the system increases to a value close to atmospheric pressure. On the other hand, when a failure has not occurred, the pressure in the system is maintained at a negative pressure or increases by a considerably small amount. Accordingly, monitoring a change in the pressure in the system makes it possible to determine whether a failure has occurred.

Meanwhile, as disclosed in, for example, Japanese Patent Application Publication No. JP(A) 09-195861, an in-tank type of canister system in which a canister is housed in a fuel tank (hereinafter, simply referred to as an "in-tank canister system") has been used recently. In the in-tank canister system, a major portion of a pipe can be located in the fuel tank. Accordingly, the in-tank canister system has an advantage that, even if evaporated fuel leaks from the pipe, a joint thereof, or the like, the evaporated fuel is not released into the atmosphere.

However, in this in-tank canister system, even if a failure (formation of a hole, or the like) occurs in the canister, the failure cannot be detected by performing the above-mentioned failure diagnostic operation. When the above-mentioned failure diagnostic operation is performed on the in-tank canister system, the canister is placed under a negative pressure in the fuel tank. Accordingly, even if a failure has occurred in the canister, when a failure has not occurred in the fuel tank, the pressure in the system does not increase to atmospheric pressure.

In order to address such a problem, Japanese Patent Application Publication No. JP(A) 2001-115915 discloses a technology for discriminating between a failure in a fuel tank and a failure in a canister.

In a failure diagnostic method disclosed in Japanese Patent Application Publication No. JP(A) 2001-115915, a purge passage through which evaporated fuel in the canister is introduced into an intake passage, and an evaporation passage (an evaporated fuel introduction passage) through which evaporated fuel in the fuel tank is introduced into the canister are connected to each other by a branch pipe, and a three-way valve is provided at a portion at which the branch pipe is connected to the purge passage. First, communication between the inside of the fuel tank and the purge passage through the branch pipe is permitted by changing the state of the three-way valve, and communication between the inside of the canister and the atmosphere is permitted by a new air introduction passage. Thus, a negative pressure is introduced into the fuel tank, while the pressure in the canister is maintained at atmospheric pressure. If the pressure in the fuel tank does not reach a target negative pressure even when a predetermined period has elapsed, or if the purge passage is blocked after the target negative pressure is reached and the pressure in the fuel tank gradually increases (the pressure in the fuel tank increases since the negative pressure in the fuel tank leaks to the inside of the canister when a failure occurs in the canister), it is determined that a failure has occurred (e.g. a hole is formed in the fuel tank or the canister, that is, there is a leakage) (i.e., a leakage diagnostic operation is performed).

Further, communication between both the inside of the fuel tank and the inside of the canister, and the purge passage is permitted through the branch pipe and the evaporation passage, and a negative pressure is introduced into the fuel tank and the canister. If the pressure in the fuel tank does not reach the target negative pressure even when a predetermined period has elapsed, or if the purge passage is blocked after the target negative pressure is reached and the pressure in the fuel tank increases to a value close to atmospheric pressure, it is determined that a failure has occurred in the fuel tank. On the other hand, if an amount of change in the pressure in the fuel tank is small, it is determined that a failure has occurred in the canister (i.e., a leakage portion diagnostic operation is performed).

However, according to the failure diagnostic method disclosed in Japanese Patent Application Publication No. JP(A) 2001-115915, it is necessary to provide the branch pipe for connecting the purge passage to the evaporation passage, and to provide the three-way valve at the portion at which the branch pipe is connected to the purge passage. Many extra components such as the branch pipe and the three-way valve need to be provided, resulting in a complicated structure and an increase in production cost.

In the "leakage portion diagnostic operation", when a failure has occurred in the fuel tank, the pressure in the fuel tank does not reach the target negative pressure even when the predetermined period has elapsed, or the pressure in the fuel tank increases to a value close to atmospheric pressure when the purge passage is blocked after the target negative pressure is reached, regardless of whether a failure has occurred in the canister. Namely, when a failure has occurred in the fuel tank, whether a failure has occurred in the canister cannot be determined. In other words, it is impossible to discriminate between the state where "a failure has occurred in both the fuel tank and the canister" and the state where "a failure has occurred in the fuel tank, but a failure has not occurred in the canister".

As described so far, concerning the in-tank canister system, a technology for accurately discriminating between a failure in the fuel tank and a failure in the canister has not been established.

SUMMARY OF THE INVENTION

The invention is made in light of the above-mentioned circumstances. It is an object of the invention to provide a failure diagnostic apparatus and failure diagnostic method for an in-tank canister system, which can accurately discriminate between a failure in a fuel tank and a failure in a canister, without making a structure complicated and without causing an increase in production cost.

According to a first aspect of the invention, there is provided a failure diagnostic apparatus for an in-tank canister system, including a canister which is provided in a fuel tank; an evaporation passage through which evaporated fuel generated in the fuel tank is introduced into the canister; an atmospheric air passage which permits communication between an inside of the canister and atmospheric air; a purge passage through which the evaporated fuel in the canister is introduced into an intake system of an internal combustion engine; a blocking device which can block a passage that permits communication between the inside of the canister and an outside of the canister; a negative pressure generating device which applies a negative pressure to the inside of the canister; a fuel tank pressure detecting device which detects a pressure in the fuel tank; and a canister pressure detecting device which detects a pressure in the canister.

BRIEF DESCRIPTION OF THE DRAWINGS

The forgoing and further objects, features, and advantages of the invention will become apparent from the following description of preferred embodiments with reference to the accompanying drawings, wherein like numerals are used to represent like elements and wherein:

FIG. 4A is a table showing a relationship between combination of presence or absence of a failure in a fuel tank and presence or absence of a failure in a canister, and a behavior of the pressure, shown in FIG. 3, in a "fuel tank failure determination operation"; and FIG. 4B is a table showing a relationship between combination of presence or absence of a failure in the fuel tank and presence or absence of a failure in the canister, and a behavior of the pressure, shown in FIG. 3, in a "canister failure determination operation".

DETAILED DESCRIPTION OF THE EXEMPLARY EMBODIMENTS

Hereafter, an embodiment of the invention will be described with reference to accompanying drawings. The description will be made concerning a case where the invention is applied to a sealed in-tank canister system.

Figure 1:
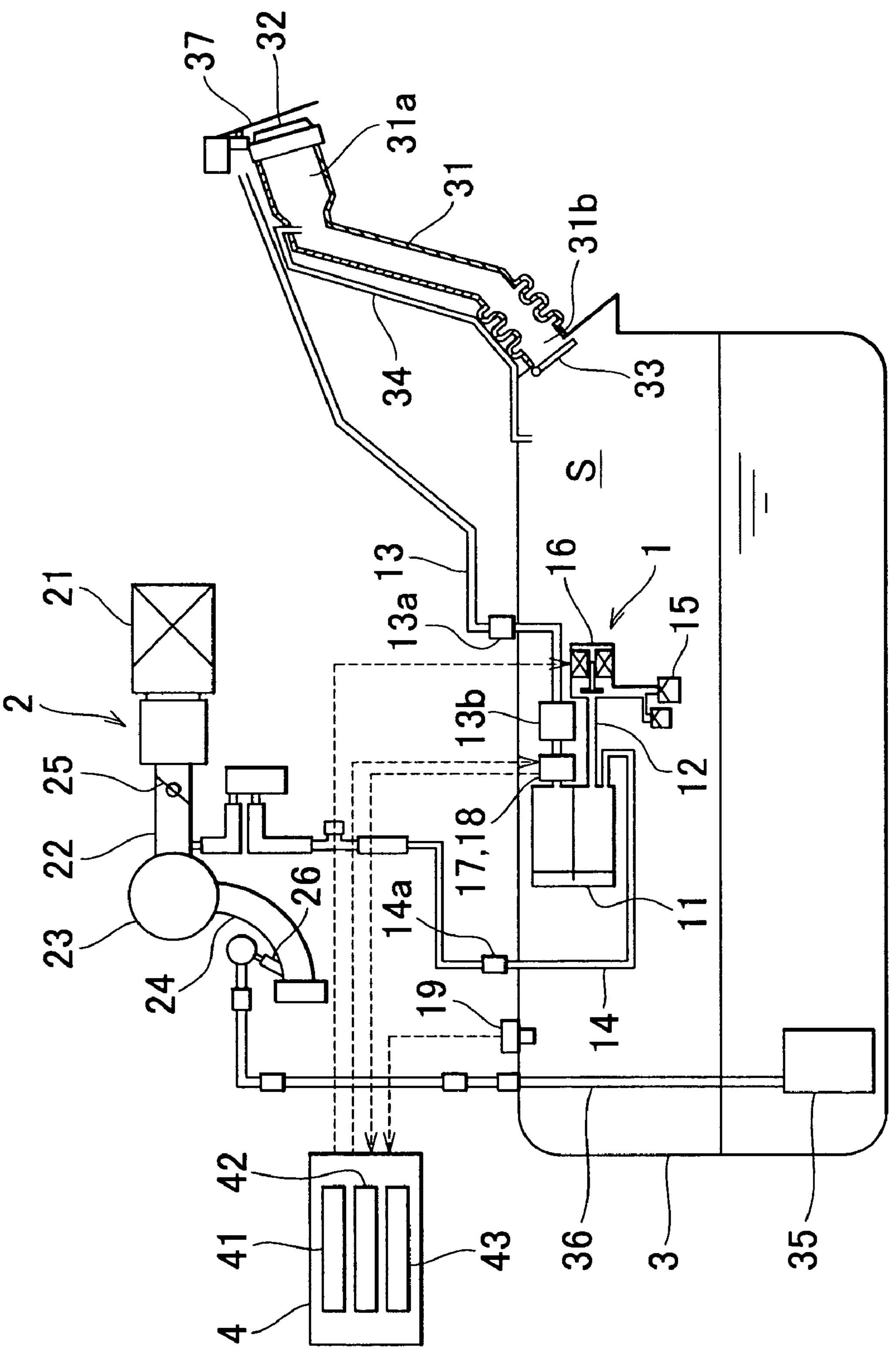
FIG. 1 is a view schematically showing an in-tank canister system and an intake system of an engine to which the in-tank canister system is connected, according to an embodiment of the invention.

FIG. 1 schematically shows a structure of an in-tank canister system 1, and an intake system 2 of an engine, to which the in-tank canister system 1 is connected, according to the embodiment.

Structure of Intake System 2 and Fuel Tank 3

As shown in FIG. 1, the intake system 2 connected to an engine (not shown) serving as an internal combustion engine includes an air cleaner 21, an intake passage 22, a surge tank 23, and an intake manifold 24, from the upstream side in the intake system 2 in a direction in which an intake air flows. A throttle valve 25 is provided in the intake passage 22, and a fuel injection valve (injector) 26 is attached to the intake manifold 24.

A fuel tank 3 which stores fuel that is to be supplied to the injector 26 is made of, for example, synthetic resin. An oil supply pipe 31 for supplying oil to the fuel tank 3 is attached to the fuel tank 3. A cap 32 is attached to an oil supply port 31*a* of the oil supply pipe 31, and a check valve 33 is provided at an opening 31*b* facing the inside of the fuel tank 3. There is provided a circulation pipe 34 for permitting communication between a portion of the oil supply pipe 31, which is close to the oil supply port 31*a*, and an upper side space S in the fuel tank 3. A fuel pump 35 is provided in the fuel tank 3, and a fuel supply pipe 36 connects the fuel pump 35 and the injector 26 each other. Thus, the fuel sent under pressure by the fuel pump 35 is injected from the injector 26 to each combustion chamber.

Structure of in-Tank Canister System 1

The in-tank canister system 1 includes a canister 11 housed in the fuel tank 3. The canister 11 is a cylindrical container made of metal or synthetic resin, and absorbs evaporated fuel generated in the fuel tank 3, thereby preventing the evaporated fuel from being released into the atmosphere. Accordingly, an absorbing agent, for example, active carbon, is provided in the canister 11. The canister 11 is connected to an evaporation pipe 12 which forms an evaporation passage, an atmospheric air pipe 13 which forms an atmospheric air passage, and a purge pipe 14 which forms a purge passage.

The evaporation pipe 12 is used for introducing evaporated fuel generated in the fuel tank 3 into the canister 11. An upstream end of the evaporation pipe 12 opens in the fuel tank 3 at a position above a fuel liquid level. A ROV (Roll Over Valve) 15 is provided at an open end portion of the evaporation pipe 12 so as to prevent fuel in liquid form from entering the evaporation pipe 12.

The atmospheric air introduction pipe 13 is used for permitting communication between the inside of the canister 11 and the atmospheric air. One end of the atmospheric air introduction pipe 13 is open at a position near a fuel lid 37 provided near the oil supply port 31*a* of the oil supply pipe 31. An atmospheric air shutoff valve 13*a* formed of an electromagnetic valve is provided in the atmospheric air introduction pipe 13. The atmospheric air shutoff valve 13*a* is usually closed. When the atmospheric air shutoff valve 13*a* opens, new air is introduced into the canister 11 through the atmospheric air introduction pipe 13. An atmospheric air dust proof filter 13*b* is provided in the atmospheric air introduction pipe 13.

The purge pipe 14 is used for introducing the evaporated fuel in the canister 11 into the intake passage 22. One end of the purge pipe 14 is connected to the intake passage 22 at a position upstream of the surge tank 23. A purge control valve 14*a* formed of an electromagnetic valve is provided in the purge pipe 14. The purge control valve 14*a* is usually closed. When the purge control valve 14*a* opens during an operation of the engine, the negative pressure in the intake passage 22 is applied to the inside of the canister 11.

Accordingly, if both atmospheric air shutoff valve 13*a* and the purge control valve 14*a* are opened when the evaporated fuel is absorbed and stored in the canister 11, the negative pressure in the intake passage 22 is applied to the inside of the canister 11, atmospheric air is introduced into the canister 11 through the atmospheric air introduction pipe 13, and the evaporated fuel in the canister 11 is introduced to the intake passage 22 through the purge pipe 14 together with the atmospheric air. The evaporated fuel is thus processed.

The purge control valve 14*a* is a so-called VSV (Vacuum Switching Valve) for controlling a flow rate of the evaporated fuel (purge gas) to be introduced to the intake passage 22. An opening amount of the purge control valve 14*a* is adjusted by duty control such that an amount of evaporated fuel to be supplied to the intake passage 22 is adjusted.

According to the embodiment, the in-tank canister system 1 includes a selector valve 16 which is provided in the evaporation pipe 12 and which serves as blocking means; a negative pressure pump 17 which is provided in the atmospheric air introduction pipe 13 and which serves as negative pressure generating means; a canister pressure sensor 18 which is provided in the atmospheric air introduction pipe 13 and which serves as canister pressure detecting means; and a fuel tank pressure sensor 19 which is attached to the fuel tank 3 and which serves as fuel tank pressure detecting means. Hereafter, the selector valve 16, the negative pressure pump 17, the canister pressure sensor 18, and the fuel tank pressure sensor 19 will be described in detail.

The selector valve 16 is formed of an electromagnetic valve. For example, the selector valve 16 is closed in a non-energized state such that communication between a space in the fuel tank 3 and a space in the canister 11 is interrupted. On the other hand, the selector valve 16 is open in an energized state such that communication between the space in the fuel tank 3 and the space in the canister 11 is permitted through the evaporation pipe 12. When the communication is permitted, the evaporated fuel in the fuel tank 3 can be introduced into the canister 11.

The negative pressure pump 17 vacuums air in the canister 11, thereby applying a negative pressure to the inside of the canister 11. The canister pressure sensor 18 is provided between the canister 11 and the negative pressure pump 17. When the negative pressure pump 17 is operated and the pressure in the canister 11 becomes a negative pressure, the canister pressure sensor 18 detects the pressure (negative pressure) in the canister 11.

The fuel tank pressure sensor 19 is provided on the upper surface of the fuel tank 3, and can detects a pressure in the space in the upper side of the fuel tank 3.

The in-tank canister system 1 includes a failure diagnostic controller 4 for performing a failure diagnostic operation for the system 1. The controller 4 is a microcomputer including a CPU, ROM, RAM, an A/D converter, an input/output interface, and the like. The controller 4 can receive signals from the above-mentioned pressure sensors 18 and 19, and control the operations of the selector valve 16 and the negative pressure pump 17.

The controller 4 includes fuel tank non-failure verifying means 41 for performing a "fuel tank non-failure verifying operation"; tank failure diagnostic means 42 for performing a "fuel tank failure diagnostic operation"; and canister failure diagnostic means 43 for performing a "canister failure diagnostic operation". Hereafter, the operations performed by the means 41, 42, and 43 will be described in detail.

The fuel tank non-failure verifying means 41 performs the "fuel tank non-failure verifying operation" for verifying that a failure, for example, formation of a hole, a crack, and inappropriate sealing, has not occurred in the fuel tank 3. In the "fuel tank non-failure verifying operation", the fuel tank non-failure verifying means 41 closes the selector valve 16 such that communication between the inside of the canister 11 and the inside of the fuel tank 3 is interrupted, stops the operation of the negative pressure pump 17, and detects the pressure in the fuel tank 3 by using the tank pressure sensor 19 when the operation of the negative pressure pump 17 is stopped. More specifically, when the pressure in the fuel tank 3 is in a pressure range from a pressure lower than atmospheric pressure by 2 kPa to a pressure higher than atmospheric pressure by 2 kPa, it is determined that the pressure in the fuel tank 3 is close to atmospheric pressure. On the other hand, when the pressure in the fuel tank 3 is out of this range, it is determined that the pressure in the fuel tank 3 is not close to atmospheric pressure. When it is determined that the pressure in the fuel tank 3 is not close to atmospheric pressure, it is verified that a failure has not occurred in the fuel tank 3.

The fuel tank failure diagnostic means 42 performs the "fuel tank failure diagnostic operation" for determining whether a failure has occurred in the fuel tank 3. In the "fuel tank failure diagnostic operation", the fuel tank diagnostic means 42 opens the selector valve 16 such that communication between the inside of the canister 11 and the inside of the fuel tank 3 is permitted, operates the negative pressure pump 17 such that a negative pressure is applied to the inside of the canister 11, and detects a change in the pressure in the fuel tank 3 by using the pressure sensor 19 when the negative pressure is applied to the inside of the canister 11. More specifically, the fuel tank failure diagnostic means 42 opens the selector valve 16, and permits communication between the inside of the canister 11 and the inside of the fuel tank 3, and the atmospheric air by using the negative pressure pump 17. The fuel tank failure diagnostic means 42 uses an ultimate pressure reached at this time as a reference pressure. The fuel tank failure diagnostic means 42 then operates the negative pressure pump 17 such that a negative pressure is applied to the inside of the canister 11. The fuel tank failure diagnostic means 42 recognizes the difference between the pressure in the fuel tank 3 detected by the fuel tank pressure sensor 19 at this time and the reference pressure, as an amount of decrease in the pressure. The fuel tank failure diagnostic means 42 then determines whether a failure has occurred in the fuel tank 3 based on the amount of decrease in the pressure, which is obtained when the pressure in the fuel tank 3 has reached an ultimate pressure (i.e., a pressure in the fuel tank 3 that is obtained when a change in the pressure becomes stable).

The canister failure diagnostic means 43 performs the "canister failure diagnostic operation" for determining whether a failure has occurred in the canister 11. In the "canister failure diagnostic operation", the canister failure diagnostic means 43 closes the selector valve 16 such that communication between the inside of the canister 11 and the inside of the fuel tank 3 is interrupted, operates the negative pressure pump 17 such that a negative pressure is applied to the inside of the canister 11, and detects a change in the pressure in the canister 11 by using the canister pressure sensor 18 when the negative pressure is applied to the inside of the canister 11. More specifically, the canister failure diagnostic means 43 closes the selector valve 16, and permits communication between the inside of the canister 11 and the atmospheric air by using the negative pressure pump

17. The canister failure diagnostic means 43 uses an ultimate pressure reached at this time as a reference pressure. The canister failure diagnostic means 43 then operates the negative pressure pump 17 such that a negative pressure is applied to the inside of the canister 11. The canister failure diagnostic means 43 recognizes the difference between the pressure in the canister 11 detected by the canister pressure sensor 18 at this time and the reference pressure, as an amount of decrease in the pressure. The canister failure diagnostic means 43 then determines whether a failure has occurred in the canister 11 based on the amount of decrease in the pressure in the canister 11, which is obtained when the pressure in the canister 11 has reached an ultimate pressure (a pressure in the canister that is obtained when a change in the pressure becomes stable) and a speed of decrease in the pressure in the canister 11, which is obtained until the ultimate pressure is reached.

In the "fuel tank non-failure verifying operation", it is verified that a failure has not occurred in the fuel tank 3 based on the following principle. When a failure has not occurred in the fuel tank 3, atmospheric pressure is not introduced into the fuel tank 3. Accordingly, when the pressure in the fuel tank 3 is not close to atmospheric pressure, it can be determined that "a failure has not occurred in the fuel tank". In the "fuel tank non-failure verifying operation", the pressure in the fuel tank 3 is detected by the pressure sensor 19. Thus, if a failure has not occurred in the fuel tank 3, it can be determined that "a failure has not occurred in the tank".

In the "fuel tank failure diagnostic operation", it is determined whether a failure has occurred in the fuel tank 3 based on the following principle. In the "fuel tank failure diagnostic operation", the negative pressure is applied to the inside of the canister 11, while the selector valve 16 is opened and communication between the inside of the canister 11 and the inside of the fuel tank 3 is permitted. Accordingly, the pressure in the fuel tank 3 and the pressure in the canister 11 are substantially equal to each other, that is, the negative pressure is also applied to the inside of the fuel tank 3. Thus, both the pressure in the canister 11 and the pressure in the fuel tank 3 become negative pressure. When a failure has not occurred in the fuel tank 3, atmospheric pressure is not introduced into the fuel tank 3. As a result, the amount of decrease in the pressure in the fuel tank 3 increases while the negative pressure pump 17 is operating. For example, the pressure in the fuel tank 3 decreases as indicated by a dashed line (b) in FIG. 3. Accordingly, if the amount of decrease in the pressure in the fuel tank 3 becomes larger than a predetermined fuel tank failure determination decrease amount X, it can be determined that "a failure has not occurred in the fuel tank". On the other hand, when a failure has occurred in the fuel tank 3, atmospheric pressure is introduced into the fuel tank 3. Accordingly, even when the negative pressure pump 17 is operating, the amount of decrease in the pressure in the fuel tank 3 does not exceed the fuel tank failure determination decrease amount X. For example, the pressure in the fuel tank 3 decreases as indicated by a solid line (c) in FIG. 3. Therefore, if the amount of decrease in the pressure in the fuel tank 3 is smaller than the fuel tank failure determination decrease amount X, it can be determined that "a failure has occurred in the fuel tank".

In the "canister failure determination operation", it is determined whether a failure has occurred in the canister 11 based on the following principle. In the "canister failure determination operation", the selector valve 16 is closed such that communication between the inside of the canister 11 and the inside of the fuel tank 3 is interrupted, whereby the negative pressure is applied to only the inside of the canister 11. When a failure has not occurred in the canister 11, the negative pressure is applied, by the negative pressure pump 17, to the inside of the canister 11, which is a relatively small space, and a pipe connecting the canister 11 to the negative pressure pump 17. Accordingly, the amount of decrease in the pressure in the canister 11 is large, and the speed of decrease in the pressure in the canister 11 is high. For example, the pressure in the canister 11 decreases as indicated by a solid line (a) in FIG. 3. Therefore, when the amount of decrease in the pressure in the canister 11 is larger than a predetermined canister failure determination decrease amount, or when the speed of decrease in the pressure in the canister 11 is higher than a predetermined canister failure determination decrease speed, it can be determined that "a failure has not occurred in the canister". On the other hand, when a failure has occurred in the canister 11, the pressure in the fuel tank 3 is introduced into the canister 11. Therefore, as compared with the case where a failure has not occurred in the canister 11, the amount of decrease in the pressure in the canister 11 is small, and the speed of decrease in the pressure in the canister 11 is low. For example, the pressure in the canister 11 decreases as indicated by the dashed line (b) or the solid line (c) in FIG. 3. Accordingly, when the amount of decrease in the pressure in the canister 11 is smaller then the predetermined canister failure determination decrease amount, or when the speed of decrease in the pressure in the canister 11 is lower than the predetermined canister failure determination decrease speed, it can be determined that "a failure has occurred in the canister".

Failure Diagnostic Operation

Figure 2A:
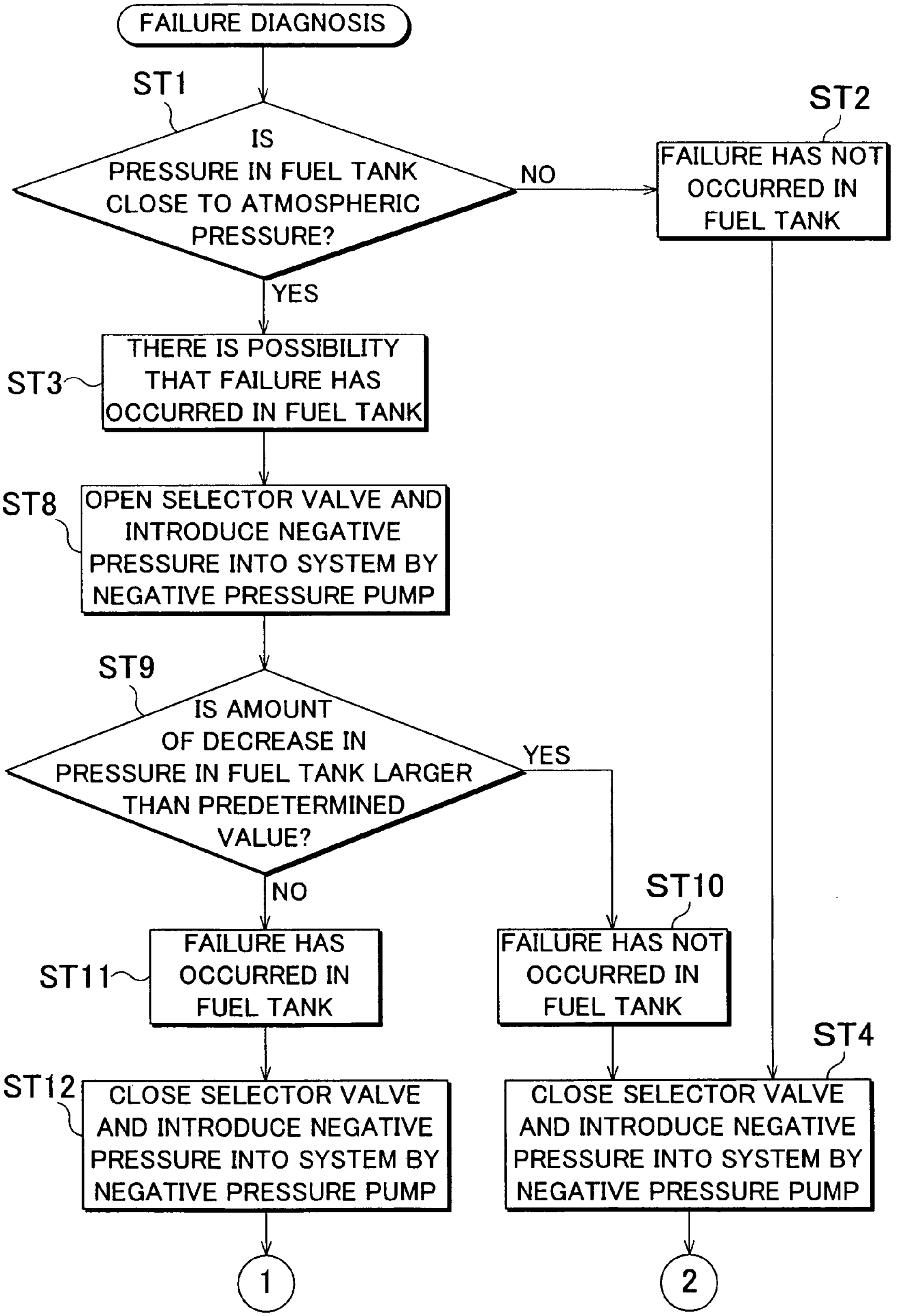
FIGS. 2A and 2B are a flowchart showing a routine of a failure diagnostic operation.
Figure 2B:
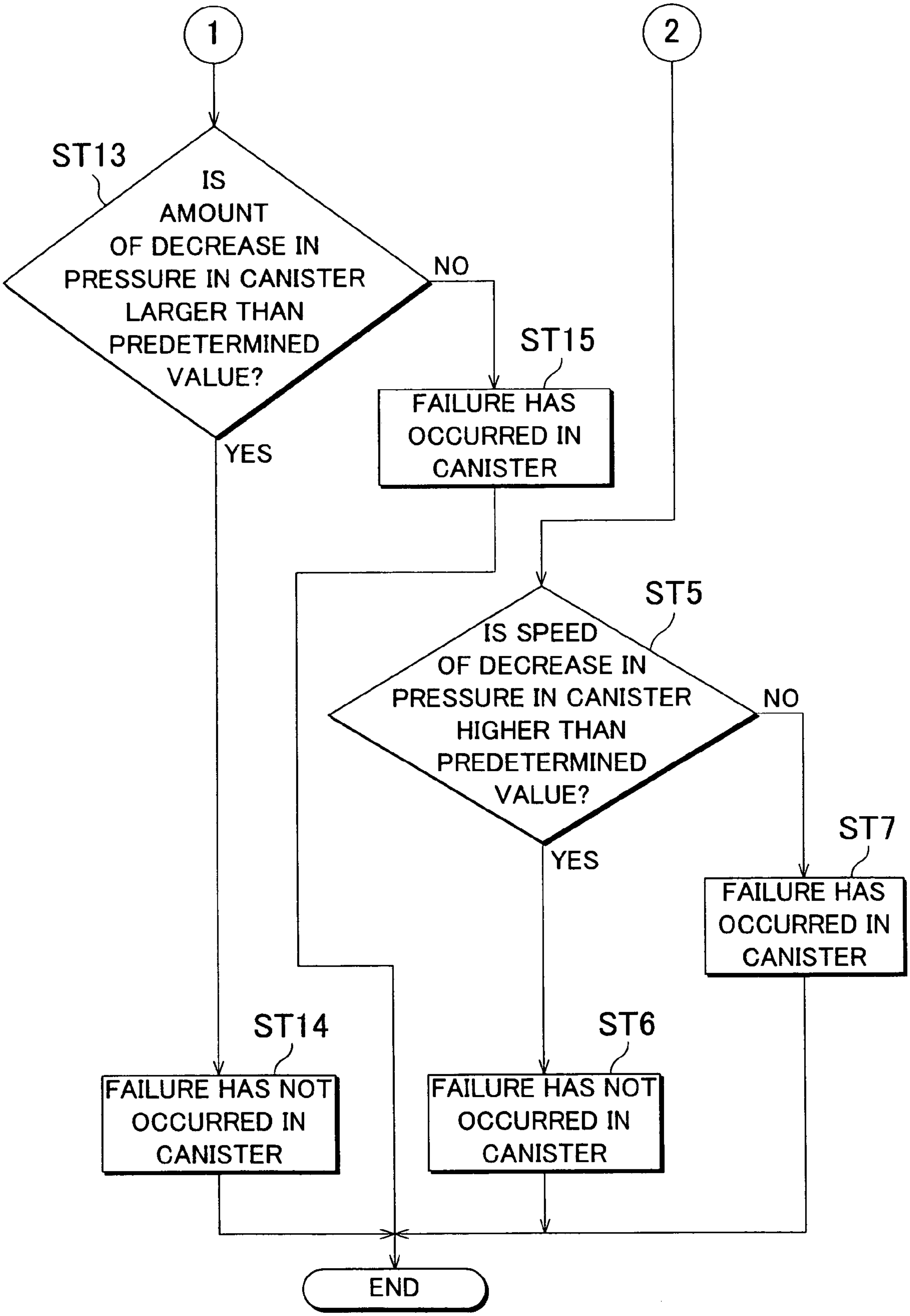

The failure diagnostic operation for the in-tank canister system 1 having the above-mentioned structure will be described in detail with reference to a flowchart shown in FIGS. 2A and 2B.

When a predetermined failure diagnostic condition (for example, the condition that the evaporated fuel is not being purged and a predetermined period has elapsed since the last failure diagnosis) is satisfied and the failure diagnostic operation is then started, step ST1 is performed. In step ST1, the fuel tank non-failure verifying means 41 performs the "fuel tank non-failure verifying operation", and the fuel tank pressure sensor 19 detects the pressure in the fuel tank 3. When it is determined in the "fuel tank non-failure verifying operation" that the pressure in the fuel tank 3 is not close to atmospheric pressure, step ST2 is performed. After it is determined in step ST2 that "a failure has not occurred in the fuel tank", step ST4 is performed. On the other hand, when it is determined in the "fuel tank non-failure verifying operation" that the pressure in the fuel tank 3 is close to atmospheric pressure, step ST3 is performed. In step ST3, it is determined that "there is a possibility that a failure has occurred in the fuel tank".

In step ST4, the canister failure diagnostic means 43 performs the "canister failure diagnostic operation" (i.e., the elector valve 16 is closed, and a negative pressure is introduced in the system by the negative pressure pump 17), and the canister pressure sensor 18 detects a change in the pressure in the canister 11. When it is determined in the "canister failure diagnostic operation" that the speed of decrease in the pressure in the canister 11 is higher than the predetermined canister failure determination decrease speed (i.e., when an affirmative determination is made in step ST5), it is determined in step ST6 that "a failure has not occurred in the canister", after which the failure diagnostic operation ends. On the other hand, when it is determined that the speed of decrease in the pressure in the canister 11 is lower than the predetermined canister failure determination decrease speed (i.e., a negative determination is made in step ST5), it is determined in step ST7 that "a failure has occurred in the canister", after which the failure diagnostic operation ends. In the "canister failure diagnostic operation", a diagnosis is made by determining whether the pressure in the canister 11 decreases as indicated by the solid line (a) or as indicated by the dashed line (b) in FIG. 3. This determination may be made by comparing the negative pressure level that is obtained when a predetermined period has passed since the start of the introduction, with the negative pressure level that is obtained when introduction of the negative pressure is started, or this determination may be made by obtaining the time that has elapsed until the predetermined negative pressure level is obtained.

On the other hand, when it is determined in step ST1 that the pressure in the fuel tank 3 is close to atmospheric pressure, and therefore it is determined in step ST3 that "there is a possibility that a failure has occurred in the fuel tank", step ST8 is performed. In step ST8, the fuel tank failure diagnostic means 42 performs the "fuel tank failure diagnostic operation" (i.e., the selector valve 16 is opened, and the negative pressure is introduced into the system by using the negative pressure pump 17), and the fuel tank pressure sensor 19 detects a change in the pressure in the fuel tank 3. When the "fuel tank failure diagnostic operation" is started, the selector valve 16, which has been closed, is opened. Since it has been verified in step ST1 that the pressure in the fuel tank 3 is close to atmospheric pressure, the situation where a large amount of evaporated fuel is present in the fuel tank 3 does not occur. Accordingly, even when the selector valve 16 is opened, the situation where a large amount of evaporated fuel is introduced into the canister 11 does not occur. When it is determined in the "fuel tank failure diagnostic operation" that the amount of decrease in the pressure in the fuel tank 3 is larger than the predetermined fuel tank failure determination decrease amount (i.e., an affirmative determination is made in step ST9), it is then determined in step ST10 that "a failure has not occurred in the fuel tank". On the other hand, when it is determined in the "fuel tank failure diagnostic operation" that the amount of decrease in the pressure in the fuel tank 3 is smaller than the predetermined fuel tank failure determination decrease amount (i.e., a negative determination is made in step ST9), it is then determined in step ST11 that "a failure has occurred in the fuel tank".

When it is determined in the "fuel tank failure diagnostic operation" that "a failure has not occurred in the fuel tank", step ST4 is performed. A change in the pressure in the canister 11 is detected (i.e, whether the speed of decrease in the pressure in the canister 11 is higher than the predetermined canister failure determination decrease speed is determined).

On the other hand, when it is determined in the "fuel tank failure diagnostic operation" that "a failure has occurred in the fuel tank", step ST12 is performed. In step ST12, the "canister failure diagnostic operation" is performed (i.e., the selector valve 16 is closed, and the negative pressure is introduced into the system by using the negative pressure pump 17). When it is determined that the amount of decrease in the pressure in the canister 11 is larger than the predetermined canister failure determination decrease amount (i.e., an affirmative determination is made in step ST13), it is determined in step ST14 that "a failure has not occurred in the canister", after which the failure diagnostic operation ends. On the other hand, when it is determined that the amount of decrease in the pressure in the canister 11 is smaller than the predetermined canister failure determination decrease amount (i.e., a negative determination is made in step ST13), it is determined in step ST15 that "a failure has occurred in the canister", after which the failure diagnostic operation ends.

In the "canister failure diagnostic operation", when a hole is formed in the pipe of the selector valve 16 on the canister 11 side, a negative pressure is introduced into the fuel tank 3 through the hole. Accordingly, as indicated by the dashed line (b) in FIG. 3, the pressure in the canister 11 gradually decreases. The point at which the negative pressure becomes saturated in the dashed line (b) substantially matches the point at which the negative pressure becomes saturated in the solid line (a) in FIG. 3. Therefore, even in such a state, if the amount of decrease in the pressure in the canister 11 is detected, the failure diagnosis for the canister 11 can be performed.

As described so far, according to the embodiment, the failure diagnosis for the fuel tank 3 and the failure diagnosis for the canister 11 can be performed independently of each other by using the same structure. Also, it is possible to accurately discriminate between a failure in the fuel tank 3 and a failure in the canister 11.

As in the embodiment, when the invention is applied to the sealed in-tank canister system 1, it is possible to discriminate between a failure in the fuel tank 3 and a failure in the canister 11 without providing extra components such as a pipe and a valve. Therefore, the structure is prevented from being complicated, and an increase in production cost can be avoided. Even when the invention is applied to an open-type in-tank canister system, only the selector valve 16 needs to be additionally provided.

In the embodiment, as means for applying a negative pressure to the inside of the canister 11, the negative pressure pump 17 is employed instead of using the intake negative pressure of the intake system 2. In the conventional technology in which the intake negative pressure of the intake system 2 is used, an air-fuel ratio (A/F) may deviate from the optimum value while the evaporated fuel is purged, making it difficult to secure the drivability. In contrast to this, according to the embodiment, the situation where the air-fuel ratio fluctuates due to the negative pressure generated for the failure diagnosis does not occur. Therefore, the problem in the conventional technology can be resolved.

When the negative pressure pump 17 is employed, the failure diagnostic operation can be performed even in the state where an intake negative pressure has not been generated in the intake system 2, that is, when the engine is not operating. In the conventional technology in which the failure diagnostic operation can performed only when the engine is operating, there is a possibility that the failure diagnostic operation needs to be stopped in midstream due to effect of a behavior of the automobile, and therefore the failure diagnosis cannot be performed sufficiently frequently. In contrast to this, according to the embodiment, the failure diagnosis can be performed in a stable state, that is, when the engine is not operating. Therefore, the reliability of the failure diagnosis can be improved, and the failure diagnosis can be performed sufficiently frequently.

Other Embodiments

In the embodiment described so far, the invention is applied to the sealed in-tank canister system 1 in which the selector valve 16 is usually closed. However, the invention is not limited to the above-mentioned embodiment, and can be applied to an open type in-tank canister system in which the selector valve 16 is usually open. Note that, in this case, communication between the inside of the fuel tank 3 and the inside of the canister 11 is always permitted, and the pressure in the fuel tank 3 is close to atmospheric pressure. It is, therefore, difficult to perform a diagnosis by the "fuel tank non-failure verifying operation". Accordingly, when the open-type in-tank canister system is used, the "fuel tank failure diagnostic operation" and the "canister failure diagnostic operation" are performed.

In the embodiment, the negative pressure pump 17 is provided in the atmospheric air introduction pipe 13. However, the negative pressure pump 17 may be provided in the purge pipe 14.

Namely, in the embodiment, a negative pressure can be introduced into the fuel tank through the inside of the canister, and the state can be switched between the state where the negative pressure is introduced into only the canister and the state where the negative pressure is introduced into both the canister and the fuel tank. This switching operation makes it possible to perform the failure diagnosis for the fuel tank and the failure diagnosis for the canister independently of each other.

First, the structure of the failure diagnostic apparatus for an in-tank canister system will be described.

The failure diagnostic apparatus for an-tank canister system includes at least the canister provided in the fuel tank; the evaporation passage through which the evaporated fuel generated in the fuel tank is introduced into the canister; the atmospheric air passage for permitting communication between the inside of the canister and the atmospheric air; and the purge passage through which the evaporated fuel in the canister is introduced into the intake system of the internal combustion engine. The failure diagnostic apparatus further includes blocking means capable of blocking the passage that permits communication between the inside and the outside of the canister; negative pressure generating means for applying a negative pressure to the inside of the canister; fuel tank pressure detecting means for detecting the pressure in the fuel tank; and canister pressure detecting means for detecting the pressure in the canister.

In order to actually perform the failure diagnostic operation, the failure diagnostic apparatus having the above-mentioned structure further includes fuel tank failure diagnostic means for performing a "fuel tank failure diagnostic operation"; and canister failure diagnostic means for performing a "canister failure diagnostic operation". The fuel tank failure diagnostic means performs the "fuel tank failure diagnostic operation" for determining whether a failure has occurred in the fuel tank. In the "fuel tank failure diagnostic operation", the fuel tank failure diagnostic means places the blocking means in an open state such that communication between the inside of the canister and the inside of the fuel tank is permitted, and operates the negative pressure generating means such that a negative pressure is applied to the inside of the canister. The fuel tank failure diagnostic means detects a change in the pressure in the fuel tank by using the fuel tank pressure detecting means when the negative pressure is applied to the inside of the canister, thereby determining whether a failure has occurred in the fuel tank.

The canister failure diagnostic means performs the "canister failure diagnostic operation" for determining whether a failure has occurred in the canister after the fuel tank failure diagnostic means performs the "fuel tank failure diagnostic operation". The canister failure diagnostic means places the blocking means in a blocking state such that communication between the inside of the canister and the inside of the fuel tank is interrupted, and operates the negative pressure generating means such that a negative pressure is applied to the inside of the canister. The canister failure diagnostic means detects a change in the pressure in the canister by using the canister pressure detecting means when the negative pressure is applied to the inside of the canister, thereby determining whether a failure has occurred in the canister.

The principle of the diagnosis in these diagnostic operations will be described. In the "fuel tank failure diagnostic operation", the negative pressure is applied to the inside of the canister while the blocking means is placed in the open state such that communication between the inside of the canister and the inside of the fuel tank is permitted. Therefore, the negative pressure is also applied to the inside of the fuel tank. Namely, both the pressure in the canister and the pressure in the fuel tank become negative pressure. When a failure has not occurred in the fuel tank, atmospheric pressure is not introduced into the fuel tank. As a result, the amount of decrease in the pressure in the fuel tank increases while the negative pressure generating means is operating. For example, the pressure in the fuel tank decreases as indicated by the dashed line (b) in FIG. 3. Accordingly, when the amount of decrease in the pressure becomes larger than the predetermined fuel tank failure determination decrease amount (for example, the decrease amount X in FIG. 3), it can be determined that "a failure has not occurred in the fuel tank".

On the other hand, when a failure has occurred in the fuel tank, atmospheric pressure is introduced into the fuel tank. Accordingly, even when the negative pressure generating means is operating, the amount of decrease in the pressure in the fuel tank does not exceed the fuel tank failure determination decrease amount. For example, the pressure in the fuel tank decreases as indicated by the solid line (c) in FIG. 3. Accordingly, when the amount of decrease in the pressure in the fuel tank is smaller than the predetermined fuel tank failure determination decrease amount, it can be determined that "a failure has occurred in the fuel tank". As mentioned above, communication between the inside of the canister and the inside of the fuel tank is permitted, and the inside of the canister and the inside of the fuel tank forms an integrated space. Accordingly, whether the pressure in the fuel tank decreases as indicated by the dashed line (b) in FIG. 3, or as indicated by the solid line (c) in FIG. 3 depends on only whether a failure has occurred in the fuel tank, regardless of whether a failure has occurred in the canister. Therefore, whether a failure has occurred in the fuel tank can be accurately determined by detecting the amount of decrease in the pressure in the fuel tank.

In the "canister failure diagnostic operation", the blocking means is placed in the blocking state such that communication between the inside of the canister and the inside of the fuel tank is interrupted, whereby the negative pressure is applied to only the inside of the canister. When a failure has not occurred in the canister, since a negative pressure from the negative pressure generating means is applied to the space in the canister, which is a relatively small space, the amount of decrease in the pressure in the canister is large, and the speed of decrease is high. For example, the pressure in the canister decreases as indicated by the solid line (a) in FIG. 3. Accordingly, when the amount of decrease in the pressure in the canister is larger than the predetermined canister failure determination decrease amount, or when the speed of decrease in the pressure in the canister is higher than the predetermined canister failure determination decrease speed, it can be determined that "a failure has not occurred in the canister".

On the other hand, when a failure has occurred in the canister, the pressure in the fuel tank is introduced into the canister. Therefore, as compared with the case where a failure has not occurred in the canister, the amount of decrease in the pressure in the canister is small, and the speed of decrease in the pressure in the canister is low. For example, the pressure in the canister decreases as indicated by the dashed line (b) or the solid line (c) in FIG. 3. Accordingly, when the amount of decrease in the pressure in the canister is smaller than the predetermined canister failure determination decrease amount, or when the speed of decrease in the pressure in the canister is lower than the predetermined canister failure determination decrease speed, it can be determined that "a failure has occurred in the canister". The manner in which the pressure in the canister changes slightly varies depending on whether a failure has occurred in the fuel tank (i.e., when a failure has not occurred in the fuel tank, the pressure in the canister decreases as indicated by the dashed line (b) in FIG. 3, and when a failure has occurred in the fuel tank, the pressure in the canister decreases as indicated by the solid line (c) in FIG. 3. However, it is possible to clearly discriminate between the manner in which the pressure in the canister changes when "a failure has occurred in the canister" and the manner in which the pressure changes when "a failure has not occurred in the canister" (the manner in which the pressure decreases as indicated by the solid line (a) in FIG. 3). Accordingly, whether a failure has occurred in the canister can be accurately determined by detecting the amount and the speed of decrease in the pressure in the canister.

Especially, in the sealed the in-tank canister system, the blocking means is usually in the blocking state. Accordingly, an operation for verifying that a failure has not occurred in the fuel tank can be performed before the "fuel tank failure diagnostic operation" is performed. More specifically, fuel tank non-failure verifying means is provided. The fuel tank non-failure verifying means performs the "fuel tank non-failure verifying operation" for verifying that a failure has not occurred in the fuel tank, before the fuel tank failure diagnostic means performs the "fuel tank failure diagnostic operation". In "the fuel tank non-failure verifying operation", the fuel tank non-failure verifying means places the blocking means in the blocking state such that communication between the inside of the canister and the inside of the fuel tank is interrupted, stops the operation of the negative pressure generating means, and detects the pressure in the fuel tank by using the fuel tank pressure detecting means when the operation of the negative pressure generating means is stopped, thereby verifying that a failure has not occurred in the fuel tank.

Namely, the pressure in the fuel tank is detected while communication between the inside of the canister and the inside of the fuel tank is interrupted. When a failure has not occurred in the fuel tank, atmospheric pressure is not introduced into the fuel tank. Accordingly, when the pressure in the fuel tank is not close to atmospheric pressure, it can be determined that "a failure has not occurred in the fuel tank". When it is determined that "a failure has not occurred in the fuel tank" in the "fuel tank non-failure verifying operation", the "fuel tank failure diagnostic operation" need not be performed, and therefore the "canister failure diagnostic operation" can be performed immediately after the "fuel tank non-failure verifying operation" is completed. Accordingly, the time required for the failure diagnosis can be reduced. Note that, when it is determined in the "fuel tank non-failure verifying operation" that the pressure in the fuel tank is close to atmospheric pressure, the failure diagnosis for the fuel tank cannot be performed (since there is a possibility that the pressure in the fuel tank is close to atmospheric pressure even if a failure has not occurred). Therefore, the "fuel tank failure diagnostic operation" needs to be performed.

The concrete structure of the blocking means and the negative pressure generating means will be described. The blocking means is a selector valve which can be switched between the open state and closed state, and which is provided in the evaporation passage. The negative pressure generating means is a negative pressure pump provided in the atmospheric air passage. Thus, it becomes possible to provide the blocking means and the negative pressure generating means in the already existing passages. Therefore, extra passages need not be provided, preventing the structure from being complicated.

Next, a failure diagnostic method that is performed by the failure diagnostic apparatus for an in-tank canister system according to one of the above-mentioned embodiments will be described.

First, a failure diagnostic method for performing the "fuel tank non-failure verifying operation" and the "canister failure diagnostic operation" will be described. This failure diagnostic method corresponds to steps ST1, ST2, and ST4 to ST7 in the flowchart in FIGS. 2A and 2B. First, the "fuel tank non-failure verifying operation" is performed. In the "fuel tank non-failure verifying operation", the blocking means is placed in the blocking state such that communication between the inside of the canister and the inside of the fuel tank is interrupted, the operation of the negative pressure generating means is stopped, and the fuel tank pressure detecting means detects the pressure in the fuel tank when the operation of the negative pressure generating means is stopped. When the pressure in the fuel tank is not close to atmospheric pressure, it is determined that "a failure has not occurred in the fuel tank".

When it is determined in the "fuel tank non-failure verifying operation" that "a failure has not occurred in the fuel tank", the "canister failure diagnostic operation" is performed. In the "canister failure diagnostic operation", the blocking means is placed in the blocking state such that communication between the inside of the canister and the inside of the fuel tank is interrupted, the negative pressure generating means is operated such that a negative pressure is applied to the inside of the canister, and the canister pressure detecting means then detects a change in the pressure in the canister when the negative pressure is applied to the inside of the canister. When the speed of decrease in the pressure in the canister is higher than the predetermined canister failure determination decrease speed, it is determined that "a failure has not occurred in the canister". On the other hand, when the speed of decrease in he pressure in the canister is lower than the predetermined canister failure determination decrease speed, it is determined that "a failure has occurred in the canister".

Making a determination in this manner makes it possible to accurately perform the canister failure diagnosis (i.e., to determine whether a failure has occurred in the canister) in the case where a failure has not occurred in the fuel tank. Namely, as mentioned above, when a failure has not occurred in the fuel tank and a failure has not occurred in the canister, either, the speed of decrease in the pressure in the canister is high. For example, the pressure in the canister decreases as indicated by the solid line (a) in FIG. 3. On the other hand, when a failure has not occurred in the fuel tank but a failure has occurred in the canister, the speed of decrease in the pressure in the canister is low. For example, the pressure in the canister decreases as indicated by the dashed line (b) in FIG. 3. The canister failure diagnosis can be accurately performed by discriminating between the manner in which the pressure in the canister decreases when a failure has not occurred in the fuel tank nor in the canister, and the manner in which the pressure in the canister decreases when a failure has not occurred in the fuel tank but a failure has occurred in the canister.

Next, the failure diagnostic method will be described. In this method, first, the "fuel tank failure diagnostic operation" is performed. If it is determined in the "fuel tank failure diagnostic operation" that "a failure has not occurred in the fuel tank", the "canister failure diagnostic operation" is performed. This failure diagnostic method corresponds to steps ST1, ST3, ST8 to ST10 and ST4 to ST7 in the after-mentioned flowchart. First, the "fuel tank failure diagnostic operation" is performed. In the "fuel tank failure diagnostic operation", the blocking means is placed in the open state such that communication between the inside of the canister and the inside of the fuel tank is permitted, the negative pressure generating means is operated such that a negative pressure is applied to the inside of the canister, and the fuel tank pressure detecting means detects a change in the pressure in the fuel tank when the negative pressure is applied to the inside of the canister. When the amount of decrease in the pressure in the fuel tank is larger than the predetermined fuel tank failure determination decrease amount, it is determined that "a failure has not occurred in the fuel tank". On the other hand, when the amount of decrease in the pressure in the fuel tank is smaller than the predetermined fuel tank failure determination decrease amount, it is determined that "a failure has occurred in the fuel tank".

Then, the "canister failure diagnostic operation" is performed. In the "canister failure diagnostic operation", the blocking means is placed in the blocking state such that communication between the inside of the canister and the inside of the fuel tank is interrupted, the negative pressure generating means is operated such that a negative pressure is applied to the inside of the canister, and the canister pressure detecting means detects a change in the pressure in the canister when the negative pressure is applied to the inside of the canister. In the case where it is determined in the "fuel tank failure diagnostic operation" that "a failure has not occurred in the fuel tank", when it is determined in the "canister failure diagnostic operation" that the speed of decrease in the pressure in the canister is higher than the predetermined canister failure determination decrease speed, it is determined that "a failure has not occurred in the canister". On the other hand, in the case where it is determined in the "fuel tank failure diagnostic operation" that "a failure has not occurred in the fuel tank", when it is determined in the "canister failure diagnostic operation" that the speed of decrease in the pressure in the canister is lower than the predetermined canister failure determination decrease speed, it is determined that "a failure has occurred in the canister".

Making a determination in this manner makes it possible to accurately perform the canister failure diagnosis (i.e., to determine whether a failure has occurred in the canister) in the case where a failure has not occurred in the fuel tank. As in the above-mentioned embodiment, when a failure has not occurred in the fuel tank and a failure has not occurred in the canister, either, the speed of decrease in the pressure in the canister is high. For example, the pressure in the canister decreases as indicated by the solid line (a) in FIG. 3. On the other hand, when a failure has not occurred in the fuel tank but a failure has occurred in the canister, the speed of decrease in the pressure in the canister is low. For example, the pressure in the canister decreases as indicated by the dashed line (b) in FIG. 3. The canister failure diagnosis can be accurately performed by discriminating between the manner in which the pressure in the canister decreases when a failure has not occurred in the fuel tank nor in the canister, and the manner in which the pressure in the canister decreases when a failure has not occurred in the fuel tank but a failure has occurred in the canister.

Next, the failure diagnostic method will be described. In this method, first, the "fuel tank failure diagnostic operation" is performed. When it is determined in the "fuel tank failure diagnostic operation" that "a failure has occurred in the fuel tank", the "canister failure diagnostic operation" is performed. This failure diagnostic method corresponds to steps ST1, ST3, ST8, ST9, and ST11 to ST15 in the after-mentioned flowchart. First, the "fuel tank failure diagnostic operation" is performed. In the "fuel tank failure diagnostic operation", the blocking means is placed in the open state such that communication between the inside of the canister and the inside of the fuel tank is permitted, the negative pressure generating means is operated such that a negative pressure is applied to the inside of the canister, and the fuel tank pressure detecting means detects a change in the pressure in the fuel tank when the negative pressure is applied to the inside of the canister. When the amount of decrease in the pressure in the fuel tank is larger than the predetermined fuel tank failure determination decrease amount, it is determined that "a failure has not occurred in the fuel tank". On the other hand, when the amount of decrease in the pressure in the fuel tank is smaller than the predetermined fuel tank failure determination decrease amount, it is determined that "a failure has occurred in the fuel tank".

Then, the "canister failure diagnostic operation" is performed. In the "canister failure diagnostic operation", the blocking means is placed in the blocking state such that communication between the inside of the canister and the inside of the fuel tank is interrupted, the negative pressure generating means is operated such that a negative pressure is applied to the inside of the canister, and the canister pressure detecting means detects a change in the pressure in the canister when the negative pressure is applied to the inside of the canister. In the case where it is determined in the "fuel tank failure diagnostic operation" that "a failure has occurred in the fuel tank", when it is determined in the "canister failure diagnostic operation" that the amount of decrease in the pressure in the canister is larger than the predetermined canister failure determination decrease amount, it is determined that "a failure has not occurred in the canister". On the other hand, in the case where it is determined in the "fuel tank failure diagnostic operation" that "a failure has occurred in the fuel tank", when it is determined in the "canister failure diagnostic operation" the amount of decrease in the pressure in the canister is smaller than the predetermined canister failure determination decrease amount, it is determined that "a failure has occurred in the canister".

Making a determination in this manner makes it possible to accurately perform the canister failure diagnosis (i.e., to determine whether a failure has occurred in the canister) in the case where a failure has occurred in the fuel tank. Namely, as mentioned above, when a failure has occurred in the fuel tank but a failure has not occurred in the canister, the amount of decrease in the pressure in the canister is large.

Figure 3:
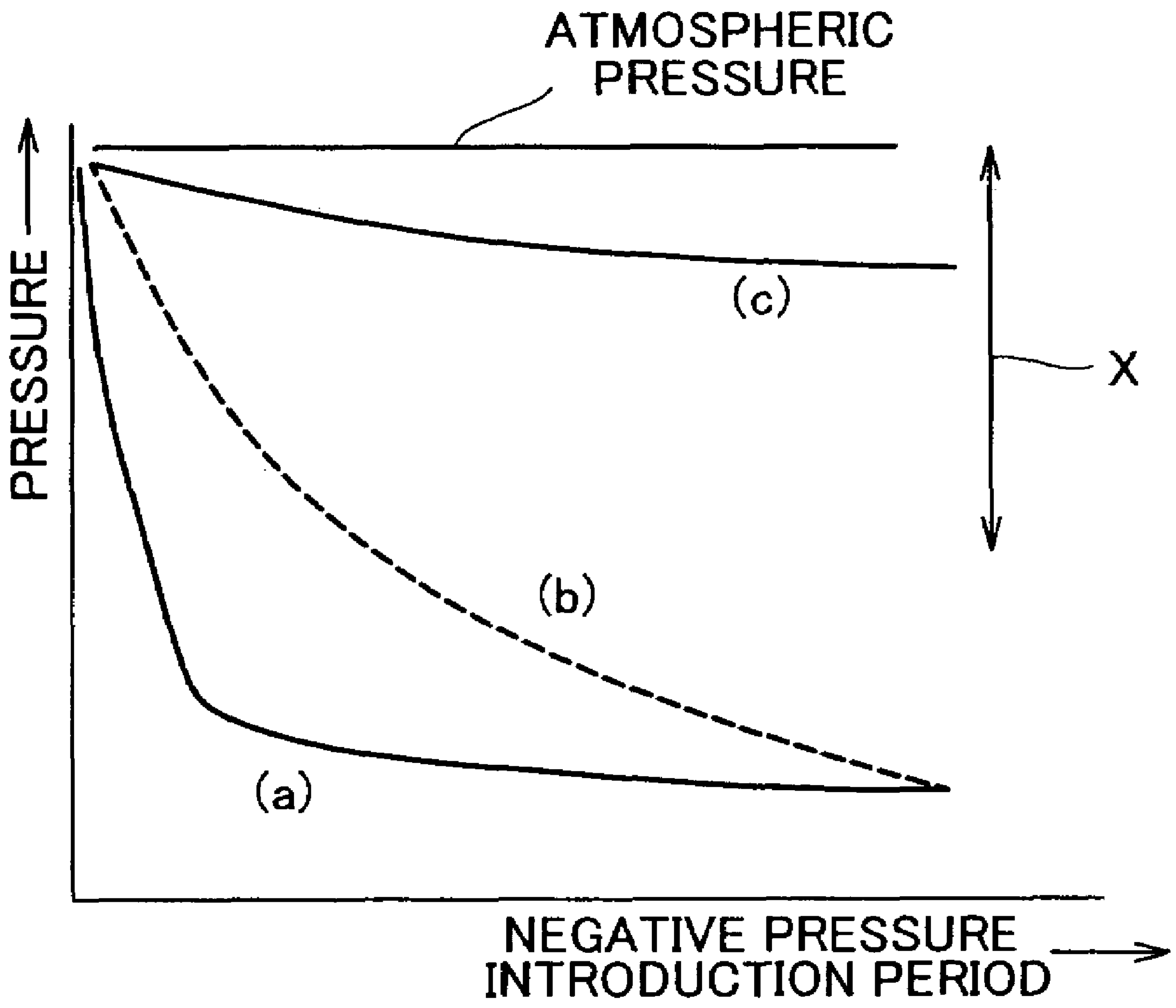
FIG. 3 is a graph showing a relationship between a portion at which a failure has occurred and a change in pressure with time during a failure diagnosis.

For example, the pressure in the canister decreases as indicated by the solid line (a) in FIG. 3. On the other hand, when a failure has occurred in both the fuel tank and the canister, the amount of decrease in the pressure in the canister is small. For example, the pressure in the canister decreases as indicated by the solid line (c) in FIG. 3. The canister failure diagnosis can be accurately performed by discriminating between the manner in which the pressure in the canister decreases when a failure has occurred in the fuel tank but a failure has not occurred in the canister, and the manner in which the pressure in the canister decreases when a failure has occurred in both the fuel tank and the canister.

FIG. 4A is a table showing a relationship between combination of presence or absence of a failure in the fuel tank and presence or absence of a failure in the canister, and the behavior of the pressure, shown in FIG. 3, in the "fuel tank failure determination operation"; and FIG. 4B is a table showing a relationship between combination of presence or absence of a failure in the fuel tank and presence or absence of a failure in the canister, and the behavior of the pressure, shown in FIG. 3, in the "canister failure determination operation". In FIGS. 4A and 4B, "OK" indicates that "a failure has not occurred", and "NG" indicates that "a failure has occurred".

The following method is performed in each of the failure diagnostic methods according to the above-mentioned embodiments. First, the "fuel tank non-failure verifying operation" is performed. In the "fuel tank non-failure verifying operation", the blocking means is placed in the blocking state such that communication between the inside of the canister and the inside of the fuel tank is interrupted, the operation of the negative pressure generating means is stopped, and the fuel tank pressure detecting means detects the pressure in the fuel tank when the operation of the negative pressure generating means is stopped. When the pressure in the fuel tank is not close to atmospheric pressure, it is determined that "a failure has not occurred in the fuel tank".

When it is determined in the "fuel tank non-failure verifying operation" that the pressure in the fuel tank is close to atmospheric pressure, the "fuel tank failure diagnostic operation" is performed. In the "fuel tank failure diagnostic operation", the blocking means is placed in the open state such that communication between the inside of the canister and the inside of the fuel tank is permitted, the negative pressure generating means is operated such that a negative pressure is applied to the inside of the canister, and the fuel tank pressure detecting means detects a change in the pressure in the fuel tank when the negative pressure is applied to the inside of the canister. When the amount of decrease in the pressure in the fuel tank is larger than the predetermined fuel tank failure determination decrease amount, it is determined that "a failure has not occurred in the fuel tank". On the other hand, when the amount of decrease in the pressure in the fuel tank is smaller than the predetermined fuel tank failure determination decrease amount, it is determined that "a failure has occurred in the fuel tank".

When it is determined in the "fuel tank non-failure verifying operation" that "a failure has not occurred in the fuel tank", or after the "fuel tank failure diagnostic operation" is performed, the "canister failure diagnostic operation" is performed. In the "canister failure diagnostic operation", the blocking means is placed in the blocking state such that communication between the inside of the canister and the inside of the fuel tank is interrupted, the negative pressure generating means is operated such that a negative pressure is applied to the inside of the canister, and the canister pressure detecting means detects a change in the pressure in the canister when the negative pressure is applied to the inside of the canister. In the case where it is determined in the "fuel tank non-failure verifying operation" or the "fuel tank failure diagnostic operation" that "a failure has not occurred in the fuel tank", when it is determined in the "canister failure diagnostic operation" that the speed of decrease in the pressure in the canister is higher than the predetermined canister failure determination decrease speed, it is determined that "a failure has not occurred in the canister". On the other hand, in the case where it is determined in the "fuel tank non-failure verifying operation" or the "fuel tank failure diagnostic operation" that "a failure has not occurred in the fuel tank", when it is determined in the "canister failure diagnostic operation" that the speed of decrease in the pressure in the canister is lower than the predetermined canister failure determination decrease speed, it is determined that "a failure has occurred in the canister".

On the other hand, in the case where it is determined in the "fuel tank failure diagnostic operation" that "a failure has occurred in the fuel tank", when it is determined in the "canister failure diagnostic operation" that the amount of decrease in the pressure in the canister is larger than the predetermined canister failure determination decrease amount, it is determined that "a failure has not occurred in the canister". On the other hand, in the case where it is determined in the "fuel tank failure diagnostic operation" that "a failure has occurred in the fuel tank", when it is determined in the "canister failure diagnostic operation" that the amount of decrease in the pressure in the canister is smaller than the predetermined canister failure determination decrease amount, it is determined that "a failure has occurred in the canister".

According to the failure diagnostic method, the failure diagnosis for the fuel tank and the failure diagnosis for the canister can be performed in a series of operations. Also, it is possible to accurately discriminate between a failure in the fuel tank and a failure in the canister.

According to the embodiments of the invention described so far, a negative pressure can be introduced in the fuel tank through the inside of the canister, the state where the negative pressure is introduced into only the canister and the state where the negative pressure is introduced into both the canister and the fuel tank can be switched by the switching the state of the blocking means capable of blocking the passage that permits communication between the inside and the outside of the canister, and the failure diagnosis for the fuel tank and the failure diagnosis for the canister can be performed independently of each other by this switching operation. Accordingly, it is possible to accurately discriminate between a failure in the fuel tank and a failure in the canister in the in-tank canister system, without making the structure complicated and without causing an increase in production cost.

What is claimed is:

1. A failure diagnostic apparatus for an in-tank canister system, comprising:

a canister which is provided in a fuel tank;

an evaporation passage through which evaporated fuel generated in the fuel tank is introduced into the canister;

an atmospheric air passage which permits communication between an inside of the canister and atmospheric air;

a purge passage through which the evaporated fuel in the canister is introduced into an intake system of an internal combustion engine;

a blocking device which can block a passage that permits communication between the inside of the canister and an outside of the canister;

a negative pressure generating device which applies a negative pressure to the inside of the canister;

a fuel tank pressure detecting device which detects a pressure in the fuel tank;

a canister pressure detecting device which detects a pressure in the canister; and a controller which is configured to change an operation state of each of the blocking device and the negative pressure generating device to a predetermined operation state, and detect at least one of the pressure in the fuel tank and the pressure in the canister by using the fuel tank pressure detecting device and the canister pressure detecting device, thereby determining whether a failure has occurred in the at least one of the fuel tank and the canister whose pressure has been detected.

2. The failure diagnostic apparatus according to claim 1, wherein the controller includes a fuel tank failure diagnostic device which places the blocking device in an open state such that communication between the inside of the canister and an inside of the fuel tank is permitted, operates the negative pressure generating device such that the negative pressure is applied to the inside of the canister, and detects a change in the pressure in the fuel tank by using the fuel tank pressure detecting device when the negative pressure is applied to the inside of the canister, thereby determining whether a failure has occurred in the fuel tank; and a canister failure diagnostic device which, after the fuel tank failure diagnostic device determines whether a failure has occurred in the fuel tank, places the blocking device in a blocking state such that communication between the inside of the canister and the inside of the fuel tank is interrupted, operates the negative pressure generating device such that the negative pressure is applied to the inside of the canister, and detects a change in the pressure in the canister by using the canister pressure detecting device when the negative pressure is applied to the inside of the canister, thereby determining whether a failure has occurred in the canister.

3. The failure diagnostic apparatus according to claim 1, wherein, the controller includes a fuel tank non-failure verifying device which, before the fuel tank failure diagnostic device determines whether a failure has occurred in the fuel tank, places the blocking device in the blocking state such that communication between the inside of the canister and the inside of the fuel tank is interrupted, stops an operation of the negative pressure generating device, and detects the pressure in the fuel tank by using the fuel tank pressure detecting device when the operation of the negative pressure generating device is stopped, thereby verifying that a failure has not occurred in the fuel tank.

4. The failure diagnostic apparatus according to claim 1, wherein the blocking device is a selector valve whose operation state can be changed between an open state and a closed state, and which is provided in the evaporation passage; and the negative pressure generating device is a negative pressure pump which is provided in the atmospheric air passage.

5. A failure diagnostic method for an in-tank canister system comprising:

a first step in which a blocking device is placed in a blocking state such that communication between an inside of a canister and an inside of a fuel tank is interrupted, and an operation of a negative pressure generating device is stopped;

a second step in which a pressure in the fuel tank is detected by a fuel tank pressure detecting device when the operation of the negative pressure generating device is stopped, whereby a fuel tank non-failure verifying operation is performed;

a third step in which, when the pressure in the fuel tank is not close to atmospheric pressure, it is determined that a failure has not occurred in the fuel tank;

a fourth step in which, when it is determined in the fuel tank non-failure verifying operation that a failure has not occurred in the fuel tank, the blocking device is placed in the blocking state such that communication between the inside of the canister and the inside of the fuel tank is interrupted, and the negative pressure generating device is operated such that a negative pressure is applied to the inside of the canister;

a fifth step in which a change in a pressure in the canister is detected by a canister pressure detecting device when the negative pressure generating device is operated such that the negative pressure is applied to the inside of the canister, whereby whether a failure has occurred in the canister is determined;

a sixth step in which, when a speed of decrease in the pressure in the canister is higher than a predetermined canister failure determination decrease speed, it is determined that a failure has not occurred in the canister; and a seventh step in which, when the speed of decrease in the pressure in the canister is lower than the predetermined canister failure determination decrease speed, it is determined that a failure has occurred in the canister.

6. A failure diagnostic method for an in-tank canister system comprising:

a first step in which a blocking device is placed in an open state such that communication between an inside of a canister and an inside of a fuel tank is permitted, and a negative pressure generating device is operated such that a negative pressure is applied to the inside of the canister;

a second step in which a change in a pressure in the fuel tank is detected by a fuel tank pressure detecting device when the negative pressure is applied to the inside of the canister, whereby whether a failure has occurred in the fuel tank is determined;

a third step in which, when an amount of decrease in the pressure in the fuel tank is larger than a predetermined fuel tank failure determination decrease amount, it is determined that a failure has not occurred in the fuel tank;

a fourth step in which, when the amount of decrease in the pressure in the fuel tank is smaller than the predetermined fuel tank failure determination decrease amount, it is determined that a failure has occurred in the fuel tank;

a fifth step in which the blocking device is placed in a blocking state such that communication between the inside of the canister and the inside of the fuel tank is interrupted, and the negative pressure generating device is operated such that the negative pressure is applied to the inside of the canister;

a sixth step in which a change in a pressure in the canister is detected by a canister pressure detecting device when the negative pressure is applied to the inside of the canister, whereby whether a failure has occurred in the canister is determined;

a seventh step in which, in a case where it is determined in the second step, for determining whether a failure has occurred in the fuel tank, that a failure has not occurred in the fuel tank, when it is determined in the sixth step, for determining whether a failure has occurred in the canister, that a speed of decrease in the pressure in the canister is higher than a predetermined canister failure determination decrease speed, it is determined that a failure has not occurred in the canister; and an eighth step in which, when the speed of decrease in the pressure in the canister is lower than the predetermined canister failure determination decrease speed, it is determined that a failure has occurred in the canister.

7. A failure diagnostic method for an in-tank canister system comprising:

a first step in which a blocking device is placed in an open state such that communication between an inside of a canister and an inside of a fuel tank is permitted, and a negative pressure generating device is operated such that a negative pressure is applied to the inside of the canister;

a second step in which a change in a pressure in the fuel tank is detected by a fuel tank pressure detecting device when the negative pressure is applied to the inside of the canister, whereby whether a failure has occurred in the fuel tank is determined;

a third step in which, when an amount of decrease in the pressure in the fuel tank is larger than a predetermined fuel tank failure determination decrease amount, it is determined that a failure has not occurred in the fuel tank;

a fourth step in which, when the amount of decrease in the pressure in the fuel tank is smaller than the predetermined fuel tank failure determination decrease amount, it is determined that a failure has occurred in the fuel tank;

a fifth step in which the blocking device is placed in a blocking state such that communication between the inside of the canister and the inside of the fuel tank is interrupted, and the negative pressure generating device is operated such that the negative pressure is applied to the inside of the canister;

a sixth step in which a change in a pressure in the canister is detected by a canister pressure detecting device when the negative pressure is applied to the inside of the canister in the fifth step, whereby whether a failure has occurred in the canister is determined;

a seventh step in which, in a case where it is determined in the second step, for determining whether a failure has occurred in the fuel tank, that a failure has occurred in the fuel tank, when it is determined in the sixth step, for determining whether a failure has occurred in the canister, that an amount of decrease in the pressure in the canister is larger than a predetermined canister failure determination decrease amount, it is determined that a failure has not occurred in the canister; and an eighth step in which, when it is determined in the seventh step that the amount of decrease in the pressure in the canister is smaller than the predetermined canister failure determination decrease amount, it is determined that a failure has occurred in the canister.

8. A failure diagnostic method for an in-tank canister system comprising:

a first step in which a blocking device is placed in a blocking state such that communication between an inside of a canister and an inside of a fuel tank is interrupted, and an operation of a negative pressure generating device is stopped;

a second step in which a pressure in the fuel tank is detected by a fuel tank pressure detecting device when the operation of the negative pressure generating device is stopped in the first step, whereby a fuel tank non-failure verifying operation is performed;

a third step in which, when the pressure in the fuel tank is not close to atmospheric pressure, it is determined that a failure has not occurred in the fuel tank;

a fourth step in which, in a case where it is determined in the fuel tank non-failure verifying operation in the second step that the pressure in the fuel tank is close to atmospheric pressure, the blocking device is placed in an open state such that communication between the inside of the canister and the inside of the fuel tank is permitted, and the negative pressure generating device is operated such that a negative pressure is applied to the inside of the canister;

a fifth step in which a change the pressure in the fuel tank is detected by the fuel tank pressure detecting device when the negative pressure is applied to the inside of the canister in the fourth step, whereby whether a failure has occurred in the fuel tank is determined;

a sixth step in which, when an amount of decrease in the pressure in the fuel tank is larger than a predetermined fuel tank failure determination decrease amount, it is determined that a failure has not occurred in the fuel tank;

a seventh step in which, when the amount of decrease in the pressure in the fuel tank is smaller than the predetermined fuel tank failure determination decrease amount, it is determined that a failure has occurred in the fuel tank;

an eighth step in which, when it is determined in the sixth step that a failure has not occurred in the fuel tank, or after the fuel tank non-failure verifying operation is performed in the second step, the blocking device is placed in the blocking state such that communication between the inside of the canister and the inside of the fuel tank is interrupted, and the negative pressure generating device is operated such that the negative pressure is applied to the inside of the canister;

a ninth step in which a change in a pressure in the canister is detected by a canister pressure detecting device when the negative pressure is applied to the inside of the canister in the eighth step, whereby whether a failure has occurred in the canister is determined;

a tenth step in which, in a case where it is determined in the fuel tank-non failure verifying operation in the second step and the fifth step that a failure has not occurred in the fuel tank, when it is determined in the ninth step, for determining whether a failure has occurred in the canister, that a speed of decrease in the pressure in the canister is higher than a predetermined canister failure determination decrease speed, it is determined that a failure has not occurred in the canister;

an eleventh step in which, when the speed of decrease in the pressure in the canister is lower than the predetermined canister failure determination decrease speed, it is determined that a failure has occurred in the canister;

a twelfth step in which, in a case where it is determined in the fuel tank non-failure verifying operation in the fifth step that a failure has occurred in the fuel tank, when it is determined in the ninth step, for determining whether a failure has occurred in the canister, that an amount of decrease in the pressure in the canister is larger than a predetermined canister failure determination decrease amount, it is determined that a failure has not occurred in the canister; and a thirteenth step in which, when the amount of decrease in the pressure in the canister is smaller than the predetermined canister failure determination decrease amount, it is determined that a failure has occurred in the canister.

9. A failure diagnostic apparatus for an in-tank canister system, comprising;

a canister provided in a fuel tank;

an evaporation passage through which evaporated fuel generated in the fuel tank is introduced into the canister;

an atmospheric air passage for permitting communication between an inside of the canister and atmospheric air;

a purge passage through which the evaporated fuel in the canister is introduced into an intake system of an internal combustion engine;

blocking means capable of blocking a passage that permits communication between the inside of the canister and an outside of the canister;

negative pressure generating means for applying a negative pressure to the inside of the canister;

fuel tank pressure detecting means for detecting a pressure in the fuel tank;

canister pressure detecting means for detecting a pressure in the canister; and control means for changing an operation state of each of the blocking means and the negative pressure generating means to a predetermined operation state, and for detecting at least one of the pressure in the fuel tank and the pressure in the canister by using the fuel tank pressure detecting means and the canister pressure detecting means, thereby determining whether a failure has occurred in the at least one of the fuel tank and the canister whose pressure has been detected.

* * * * *

UNITED STATES PATENT AND TRADEMARK OFFICE

CERTIFICATE OF CORRECTION

PATENT NO. : 7,204,239 B2
APPLICATION NO. : 11/176201
DATED : April 17, 2007
INVENTOR(S) : Yojiro Iriyama It is certified that error appears in the above-identified patent and that said Letters Patent is hereby corrected as shown below:

In column 11, line 26, please change the line as follows:
“an-tank” to --an in-tank--

In column 13, line 22, please change the line as follows:
“Fig. 3” to --Fig. 3).--

In column 13, line 32, please change the line as follows:
“sealed the in-tank” to --sealed in-tank--

In column 14, line 53, please change the line as follows:
“he pressure” to --the pressure--

In column 22, claim 8, line 29, please change the line as follows:
“change the pressure” to --change in the pressure--

In column 22, claim 8, line 59, please change the line as follows:
“fuel tank-non failure” to --fuel tank non-failure--

Signed and Sealed this

Twenty-eighth Day of August, 2007

JON W. DUDAS
*Director of the United States Patent and Trademark Office*